United States Patent Office 3,017,260
Patented Jan. 16, 1962

3,017,260
SOLID COMPOSITE ROCKET PROPELLANTS CONTAINING POLY(VINYL LOWER ALKYL ETHERS)
Gordon J. Arquette, Plainfield, Daniel S. Dixler, Springfield, and Murray P. Strier, Madison, N.J., assignors to Air Reduction Company, Incorporated, New York, N.Y., a corporation of New York
No Drawing. Filed May 9, 1958, Ser. No. 734,123
5 Claims. (Cl. 149—60)

This invention relates to a novel solid composition comprising a poly(vinyl lower alkyl ether), and an oxidizer, more particularly a composition comprising a poly(vinyl methyl ether) and an oxidizer, and the invention is more specifically concerned with a composition of the character indicated which is combustible and which has special utility as a rocket propellant.

It is well known that solid propellants useful for propelling rockets and the like are becoming increasingly important due to certain inherent advantages possessed by these propellants as contrasted with the so-called liquid propellants, such as those embodying liquid hydrogen, hydrocarbons or alcohols as the fuel component of the propellant. Ease of preparation, handling and storage are only a few of the important, well-recognized advantages of solid propellants.

A rocket is a self-contained power plant which is capable of converting the energy released by a chemical reaction into a high-velocity stream of gas molecules which is directed through a nozzle to produce a thrust. The chemical reaction is the combustion of the propellant, carried by the rocket, which consists of a fuel and an oxidizer and thus contains all of the materials necessary for sustaining chemical combustion, since the rocket does not rely upon an external source of oxygen. It will be obvious that a desirable propellant is one which, for minimum weight and volume, will supply maximum energy upon combustion.

In order to be suitable for use in propelling rockets and the like, however, solid propellants must possess very definite and specific properties. The solid propellant must, for example, have high specific impulse, which is defined as the amount of thrust in pounds that can be obtained from each pound of propellant consumed per second. The solid propellant must also be stable under the conditions normally encountered in handling and storing the propellant before use. Upon ignition, the propellant must burn smoothly and evenly at a steady rate, this property being suitably expressed in terms of a burning rate exponent ($n$) which should lie within the range 0.3 to 0.9, a value as close to 0.3 as possible being preferred. The exponent ($n$) is part of the standard burning rate formula which is described, for example, on page 316 of "Rocket Propulsion Elements," by George P. Sutton, 2nd edition, 1956.

In addition, the propellant must be comparatively easy to form and mold under pressure and it must have the ability to withstand severe hot and cold cycling without deformation. The propellant must have the ability to elongate by at least about 10% of its length without breaking. Additionally, the propellant should be resistant to erosion during burning, and it is desirable that the propellant be case bondable.

In view of the above-mentioned rather stringent requirements, few solid propellants have found acceptance despite the growing importance and criticality of the need for suitable solid propellants, and the search for suitable compositions of this type has been a continuing one.

It is an object of this invention to provide a novel solid propellant useful in the propulsion of rockets.

It is a further object to provide a novel propellant meeting the important requirements described above for a solid propellant.

It is another object of the invention to provide a new composition of matter consisting essentially of a poly(vinyl lower alkyl ether) and an oxidizer.

Other objects will be apparent from the following detailed description of the invention.

It has now been found that a composition comprising normally form-stable poly(vinyl lower alkyl ether), especially poly(vinyl methyl ether), and an oxidizer fulfills the above requirements and is particularly useful as a solid propellant.

The poly(vinyl lower alkyl ether) used in making the solid combustible composition of this invention may be either form-stable high molecular weight amorphous poly(vinyl lower alkyl ether) or form-stable high molecular weight crystalline poly(vinyl lower alkyl ether), and a blend of the crystalline and amorphous polymers containing for example 50 to 95% by weight amorphous polymer and 5 to 50% by weight crystalline polymer, has been found to be particularly advantageous. The characteristics and properties of these form-stable poly(vinyl lower alkyl ethers) and their manner of preparation will be more fully described below.

Oxidizers useful in the compositions of this invention are of the type commonly employed in the art in the formulation of solid propellants, as described, for example, on pages 334–336 of "Rocket Propulsion Elements," by George P. Sutton, 2nd edition, 1956. We have found that ammonium perchlorate is particularly advantageous as the oxidizer for our propellant but other known oxidizers such as ammonium nitrate, potassium perchlorate, and the like are fully suitable. Mixtures of one or more oxidizers can be employed.

The combustible compositions of the invention preferably comprise about 80% by weight of oxidizer and 20% by weight of poly(vinyl lower alkyl ether). However, the proportions of oxidizer and poly(vinyl lower alkyl ether) are variable over a substantial range. Generally suitable proportions range from about 50 to 95% by weight of oxidizer to about 50 to 5% by weight of poly(vinyl lower alkyl ether). As will be understood by those skilled in the art, too high a proportion of poly(vinyl lower alkyl ether) tends to lessen the specific impulse obtainable while too low a proportion of poly(vinyl lower alkyl ether) tends also to affect adversely the specific impulse and the mechanical properties of the solid propellant.

The amorphous, normally form-stable poly(vinyl lower alkyl ether) which is suitably used in the composition of the present invention is prepared in several ways, as described for example in co-pending application Serial No. 734,128, filed May 9, 1958, of Gordon J. Arquette entitled "Process of Making Polymers of Vinyl Ethers" and in co-pending application Serial No. 734,129, filed May 9, 1958, of Julius G. Shukys entitled "Process of Making Vinyl Ether Polymers," both filed on even date herewith. Thus, the polymer is advantageously prepared using a catalyst system comprising zinc chloride and tertiary butyl chloride, as described in said co-pending application of Julius G. Shukys entitled "Process of Making Vinyl Ether Polymers." As set forth in said application, the polymerization is conveniently conducted in bulk, using as catalyst 0.2 to 10 parts by weight of tertiary butyl chloride per part of zinc chloride. Inert solvents such as propane and the like are, however, also suitably used. It has been found convenient to conduct the polymerization with continuous stirring at about the boiling point of the mixture although temperatures in the range of about −20° C. to 20° C. are suitably employed. Polymerization for about 1 to 48 hours produces poly(vinyl lower alkyl ethers) which have high molecular weights, e.g. 40,000 and above and high intrinsic viscosities, e.g. 0.4 deciliter/gram and above, as determined by the procedure described, for example, on pages 309–314 of "Principles of Polymer Chemistry," by Paul J. Flory (Cornell University Press, 1953).

Amorphous poly(vinyl lower alkyl ethers) suitable for making the composition of the invention are also suitably prepared by the process described in the above-mentioned co-pending application of Gordon J. Arquette entitled "Process of Making Polymers of Vinyl Ethers," wherein polymerization of vinyl lower alkyl ether monomer is effected by means of a catalyst prepared by combining 1 to 500 parts by volume of a hydrogen-containing chloromethane, such as chloroform, with one part by volume of a boron trifluoride ether complex, e.g. 50 parts by volume of chloroform and 1 part by volume of boron trifluoride-diethyl ether. Only about 1.5 parts by weight of this catalyst complex per 100 parts by weight of monomer is required and polymerization is generally complete in two hours. A temperature of −50° C. to 90° C. is suitably employed.

In addition to the above, form-stable amorphous poly(vinyl lower alkyl ethers) suitable for use in the compositions of this invention are suitably formed by polymerizing a vinyl lower alkyl ether in the presence of a boron trifluoride ether catalyst at very low temperature, e.g. about −75 to −80° C. as described in the co-pending application Serial No. 734,229 of Gordon J. Arquette and Julius G. Shukys entitle "Vinyl Ether Polymers and Process of Making Same," also filed on even date herewith. A hydrocarbon solvent such as propane is suitably employed and polymerization times of about ½ to 24 hours are observed.

The amorphous, form-stable poly(vinyl lower alkyl ether) useful in the practice of the present invention, and suitably provided by the processes described above, has an intrinsic viscosity of about 0.2 to 1.3 dl./gm. This material is resilient and undergoes cold flow when stretched. An X-ray diagram of the unstretched poly(vinyl methyl ether), for example, shows typically amorphous characteristics. The poly(vinyl lower alkyl ethers) are also characterized by a molecular weight of at least about 10,000, and generally 40,000 to 330,000.

The crystalline poly(vinyl lower alkyl ether) which is suitably employed in the present invention is prepared by polymerizing a vinyl lower alkyl ether in a hydrocarbon solvent such as propane at low temperature, e.g. −75° to −80° C. with a boron trifluoride ether complex, such as boron trifluoride-diethyl ether, as catalyst together with an activator which is powdered solid carbon dioxide and/or a chlorinated alkane such as chloroform, as described in said co-pending application of Gordon J. Arquette and Julius G. Shukys entitled "Vinyl Ether Polymers and Process of Making Same." An induction period of about two hours is usually observed prior to commencement of the polymerization, and the polymerization is generally complete in about 2½ to 3 hours.

The crystalline poly(vinyl lower alkyl ether) thus prepared and employed in the present invention is form-stable and has an intrinsic viscosity in the range of about 0.2 to 2.0 dm./gm., a molecular weight of 10,000 to 700,000 and an extent of crystallinity of at least 15%, e.g. 20% to 40% as determined by conventional X-ray diffraction methods using a standard spectrometer. The crystalline polymer has high tensile strength, e.g. 1,000 to 2,000 p.s.i. and an elongation of at least 400%. An X-ray diagram of the unstretched poly(vinyl methyl ether), for example, shows typically crystalline characteristics.

The vinyl lower alkyl ether monomer which is employed in making the above-described polymers by the several methods indicated, particularly the crystalline polymer, is suitably one which is substantially free from the contaminants normally present in the commercial forms of vinyl methyl ether. Commercial vinyl methyl ether is commonly produced by the reaction of acetylene upon methanol and commercial vinyl methyl ether normally contains a total of about 5% of contaminants consisting of methanol, water, acetaldehyde, acetylene, and possibly dimethyl acetal. To reduce to a minimum the quantities of the contaminants present, particularly the methanol, the commercial monomer is suitably treated by refluxing it, e.g. at 6° C., in the presence of solid potassium hydroxide for about 16 hours, followed by refluxing over metallic sodium for about 16 hours. When the alcohol has been eliminated, the surface of fresh metallic sodium added to the refluxing ether remains shiny and there is thus provided a rapid test for determining the absence of alcohol. The ether is separated from the potassium hydroxide by simple distillation and, following the treatment over metallic sodium, the ether is distilled through a fractionating column until the distillate gives a negative test for acetylene (Ilosvay's reagent) and acetaldehyde (Tollen's reagent). In some cases, however, particularly in the preparation of the amorphous polyvinyl methyl ether, it is sufficient to wash the monomer with water thoroughly to remove the methanol or other alcohol, followed by drying over KOH and distillation to recover the monomer.

The compositions of the invention normally have good stability upon aging. The presence of significant amounts of catalyst in the poly(vinyl lower alkyl ether) may, however, have a deleterious effect upon the stability of the polymer, however, and thus it is desirable to remove the catalyst as completely as is practicably possible. This is done by deactivating or "quenching" the catalyst after polymerization and, in some cases, re-precipitating it from solution.

The quenching of acid-reacting catalysts is a well-known procedure and is suitably effected by treating the polymerization mass with a mixture of equal amounts of methanol and ammonium hydroxide containing a small amount, e.g. 1%, of thymol, or other oxidation inhibitor. Instead of ammonium hydroxide, other alkaline reagents such as anhydrous ammonia, sodium hydroxide, potassium hydroxide or organic amines such as methylamine, ethanolamine, pyridine, and the like may be used, and instead of methanol, other alcohols such as ethanol and butanol, and the like may be employed. For each volume of the polymerization mass there are advantageously employed 0.05 to 1 volume of the quenching mixture.

After deactivation or "quenching" of the catalyst, the polymer is suitably recovered merely by evaporation of the alkaline solvent. The polymer is then dried, preferably under vacuum, in a low temperature oven, e.g. at 30 to 50° C. to constant weight. In the case of the polymer produced with the zinc chloride-tertiary butyl chloride catalyst, however, further treatment is required. In this case, there is added a sufficient amount of a solvent, such as an alcohol, e.g. methanol, in which the polymer is soluble and which is itself water-soluble to dissolve the polymer and then water is added to the resulting solution in an amount corresponding to 5 to 10 times the amount of alcohol. Upon heating to 35–40° C., the polymer precipitates from the alcohol-water mixture and is readily recovered by decantation. The precipitation is then repeated by again dissolving the polymer in an alcohol, e.g. methanol, containing an alkaline reagent such as ammonium hydroxide, and then adding 5 to 10 volumes of water and heating. Finally, the polymer is dried under vacuum in a low temperature oven, e.g. at 30° to 50°, to constant weight.

If desired, further small amounts, e.g. 1%, of a stabilizer such as thymol may be added to the polymer.

In accordance with the present invention, the form-stable amorphous high molecular weight poly(vinyl lower alkyl ether) or the crystalline high molecular weight poly(vinyl lower alkyl ether) or mixtures of these two types of polymers are intimately admixed and blended with the oxidizer, e.g. ammonium perchlorate, to form the improved solid propellant of the invention. Such mixing and blending is conveniently effected by milling the polymer and powdered oxidizer on a 2-roll mill, such as is used in rubber compounding, until a substantially homogeneous blend is obtained. Alternatively, the polymeric vinyl lower alkyl ether may be heated and thoroughly mixed with the powdered oxidizer in a sigma bladed mixer, for example. Generally, heating to a temperature of 60° C. is sufficient for the amorphous polymers but generally heating to a higher temperature, e.g. 90° C. is desirable in the case of the crystalline polymer. The homogeneous blend is then pressed into a suitable form for subsequent use. Pressing and molding are effected by conventional means such as compression molding. The poly(vinyl lower alkyl ether) becomes tacky upon pressing and adheres strongly to metal thus providing an effectively case-bondable propellant composition.

One of the characteristics of the polymers produced by the methods above described is their tendency to undergo cross-linkage when treated with a cross-linking agent, such as benzoyl peroxide or gamma irradiation, to acquire thermosetting properties. This is a particularly valuable property in a fuel for solid rocket propellants since it is possible to render the propellant thermosetting after the normally thermoplastic material has been molded and charged into the casing in which it is to be used. Such cross-linkage does not adversely affect the tensile strength and elongation characteristics of the propellant but, on the contrary, it improves these properties. Consequently, it is advantageous to incorporate a cross-linking agent such as benzoyl peroxide in the polymer-oxidizer blend and to heat the blend after it has been charged into its casing to effect cross-linkage, or to gamma irradiate the filled casing to cross-link its contents. As previously mentioned, a mixture of amorphous polymer and crystalline polymer has been found to be particularly suitable in preparing the compositions of this invention and it is believed that this mixture gives highly effective results because the crystallization gives the mechanical effects of cross-linkage even without the specific application of a cross-linking agent.

The following specific examples are further illustrative of the invention, it being understood that these examples are given by way of illustration only and are not to be considered as limitative of the invention. Unless otherwise specified, all parts are by weight.

*Example 1*

A reaction mixture was formed from 19 parts by weight of propane, 37.5 parts of vinyl methyl ether, 60 parts of powdered solid carbon dioxide and 0.6 part of boron trifluoride-ethyl ether. The mixture was made in a vessel cooled by a surrounding mass of solid carbon dioxide and provided with a solid carbon dioxide condenser and was prepared by adding all of the components in the order specified, with the mixture of propane and vinyl methyl ether being cooled to —78° C. prior to the addition of the other components. The resultant mixture was then allowed to stand at —78° C. for 2¼ hours at the end of which time polymerization had taken place. The polymerization mass was then quenched with methanol saturated with ammonia gas containing 1% thymol, the quenching mixture being used in the quantity of .2 volume per volume of polymerization mass. There was then added 1 volume of methanol and the mixture was stirred to dissolve the polymer. After separation of the solvent, the polymer was dried to constant weight in an oven at 40° C.

There were thus recovered from the reaction mass 36 parts of polymer, representing a yield of 96%, and the polymer was found to have the following characteristics:

| | |
|---|---:|
| Molecular weight | 190,000 |
| Tensile strength, p.s.i. | 993 |
| Elongation, percent | 4737 |
| Intrinsic viscosity, dl./gm. | 0.95 |

*Example 2*

In a polymerization flask there were mixed together 37.5 parts of vinyl methyl ether, 43 parts of propane, and 0.6 part of boron trifluoride-ethyl ether, the propane and monomer being cooled to —78° C. by immersing the flask in a solid carbon dioxide bath prior to the addition of the catalyst. The mixture was then allowed to stand for 24 hours at —78° C. and the polymerization product, after recovery in 89.8% yield by the procedure described in Example 1, was found to be entirely amorphous and to have the following characteristics:

| | |
|---|---:|
| Tensile strength, p.s.i. | 36.9 |
| Elongation, percent | 3,213 |
| Intrinsic viscosity, dl./gm. | 1.40 |
| Molecular weight | 380,000 |

Although this product has a low tensile strength, it had a high percentage elongation and a very high intrinsic viscosity and molecular weight as compared with amorphous vinyl methyl ether polymers heretofore known.

*Example 3*

Into a flask provided with a solid carbon dioxide condenser, and maintained at substantially —15° C. by means of a refrigerated air bath, there were charged 105 parts of vinyl methyl ether, 0.2 part of crushed zinc chloride and 1.7 parts of tertiary butyl chloride. After 48 hours the reaction mixture was quenched and the polymer recovered. Quenching was effected by adding a mixture of equal parts of methanol and ammonium hydroxide containing 1% thymol, the quenching mixture being used in the quantity of 0.3 volume per volume of polymerization mass. There were then added 0.7 volume of methanol and the mixture was stirred to dissolve the polymer. The polymer was then precipitated by adding 10 volumes of cold water and heating, to 40° C. The poly(vinyl methyl ether) was separated by decantation and was then redissolved in 1 volume of methanol. Upon the addition of 10 volumes of water and heating to 40° C., re-precipitation of the polymer was effected. Following separation by decantation, the polymer was dried under vacuum to constant weight in an oven at 40° C.

There was thus recovered an amorphous poly(vinyl methyl ether) in almost quantitative yield which was clear and colorless and highly resistant to discoloration upon exposure to heat and light. It had an intrinsic viscosity (dl./gm.) of substantially 0.5 and a corresponding molecular weight of about 60,000.

*Example 4*

A catalyst was prepared by combining 1 part by volume of boron trifluoride-ethyl ether complex with 50 parts of chloroform by volume. These two compounds were mixed together in the proportions indicated and allowed to stand for 10 minutes. Into a polymerization flask containing 133 parts of vinyl methyl ether there was added 1 part of the above-described catalyst. The flask was provided with a solid carbon dioxide condenser and with a thermometer and prior to addition of the catalyst it was packed in wet ice. After addition of the catalyst, reaction began with rapid reflux from the condenser. After about only three minutes, the reaction became relatively quiet, leaving a colorless liquid. This liquid continued to thicken as the reaction proceeded and after about two hours the reaction mixture was quenched and the polymer recovered as described in Example 1.

There was thus recovered from the reaction mixture in 75% yield a clear, colorless, non-tacky polyvinyl methyl ether having an intrinsic viscosity (dl./gm.) of 0.8 and a molecular weight of 150,000.

In the foregoing examples the preparation of poly(vinyl methyl ether) has been described and this polymer is preferred in preparing the compositions of the invention. However, as previously indicated use may also be made of polymers of other vinyl lower alkyl ethers, e.g. vinyl ethers having alkyl groups containing up to four carbon atoms, such as ethyl, propyl and butyl, and the following two examples show the preparation of representative members of these other poly(vinyl lower alkyl ethers).

*Example 5*

In a flask provided with a water condenser there were mixed 317 parts by volume of pentane, 130 parts by volume of vinyl ethyl ether and 0.8 part by volume of the boron trifluoride-ethyl ether-chloroform catalyst described in Example 4, the catalyst being added in two 0.4 part increments spaced 15 minutes apart. After addition of the second increment, reaction became apparent as the temperature rose from room temperature to 34° C. After 4 hours the polymerization mixture was quenched and the polymer recovered in the manner described in Example 1, except that the quenching mixture comprised equal parts of pentane and ammonia. The poly(vinyl ethyl ether) thus recovered was clear and colorless with an intrinsic viscosity (dl./gm.) of 0.39.

*Example 6*

The procedure of Example 5 was followed except that 130 parts by volume of vinyl isopropyl ether were used instead of vinyl ethyl ether, and only 0.4 part of catalyst was employed and this was added in a single increment. The clear, colorless poly(vinyl isopropyl ether) was found to have an intrinsic viscosity of 0.828 dl./gm.

About 80 parts of ammonium perchlorate in powdered form were placed in a sigma blade mixer and about 20 parts of the amorphous polyvinyl methyl ether of Example 3 were added portionwise with constant mixing. After about two minutes of mixing, a homogeneous product mixture was obtained. The product mixture had a tensile strength of about 75 p.s.i., and the elongation of the product was 60%. When subjected to strand burner tests, the propellant burned smoothly and rapidly, giving an "$n$" (rate coefficient) value of 0.4. The calculated specific impulse for the product was about 240 pounds per second per pound.

The thus-produced propellant was subjected to impact sensitivity and thermal stability tests. The results of these tests showed that the propellant was thermally stable well above all temperatures prevailing during the preparation, handling and storage of the product. The low sensitivity of this product to impact or mechanical shock was such that the possibility of this means of initiation occurring during mixing or forming was substantially precluded.

It will be observed that the tensile strength and elongation of the propellant mixture described above are much less than the corresponding values of the polymer component itself due to the mechanical action of the powdered oxidizer. However, the values for the propellant are fully sufficient for optimum operation. While the particle size of the solenoid oxidizer has some influence on tensile strength and percentage elongation, particle sizes of 0.15 mm. to 0.04 mm. are fully suitable.

Results similar to those described above are obtained by using other known oxidizers, such as ammonium nitrate and potassium perchlorate, and by using amorphous polyvinyl methyl ether polymers produced by the procedures of Examples 2 and 4. Similarly good results are also obtained by mixing an oxidizer such as ammonium nitrate with a crystalline polyvinyl methyl ether polymer such as the product of Example 1. The particularly suitable and effective propellant which is obtained by combining a solid oxidizer with a mixture of an amorphous polyvinyl methyl ether and a crystalline polyvinyl methyl ether is readily produced by using an amorphous polymer such as the product of Example 3 with a crystalline polymer such as the product of Example 1.

Thus, 80 parts of powdered ammonium perchlorate were mixed with 18 parts of the amorphous polymer of Example 3 and 2 parts of the crystalline polymer of Example 1 in a sigma bladed mixer for 2 minutes until a homogeneous blend was formed. This composition yields an "$n$" value of about 0.4 and a specific impulse value of about 240 pounds per second per pound. The propellant had a tensile strength of 115 p.s.i. and a percentage elongation of 50. Increasing the percentage of crystalline polymer raises the tensile strength of the combined oxidizer-polymer blend, but tends to lower the percentage elongation and for this reason it is best to mix the crystalline polymer with at least an equal weight of the amorphous polymer. Thus, a propellant formed from 80 parts of ammonium perchlorate, 10 parts of amorphous polyvinyl methyl ether, such as the product of Example 3, and 10 parts of crystalline polyvinyl ether, such as the product of Example 1, has a tensile strength of 660 p.s.i. and an elongation of 21%.

When corresponding percentages of poly(vinyl lower alkyl ethers) other than poly(vinyl methyl ether) are substituted for the vinyl methyl ether polymers in the above examples of propellant preparation wherein the polymer is combined with an oxidizer effective propellants are also obtained. Thus, when rocket propellants are prepared by combining 80 parts by weight of ammonium perchlorate with 20 parts by weight of each of poly(vinyl ethyl ether), poly(vinyl n-propyl ether) and poly(vinyl n-butyl ether), the following specific impulse values, in pounds per second per pound, are found for the resulting products:

Poly(vinyl ethyl ether)—ammonium perchlorate___ 229
Poly(vinyl n-propyl ether)—ammonium perchlorate_ 220
Poly(vinyl n-butyl ether)—ammonium perchlorate__ 214

When the polymers of the above examples are mixed with a solid oxidizer as described, and are cross-linked, e.g. with 0.1 to 10% benzoyl peroxide, or by gamma ray irradiation of $10^7$ m.e.v., they become thermosetting and increase in tensile strength by at least 20%.

It will be understood that various changes and modifications may be made in the subject matter described above without departing from the invention as defined in the appended claims. For example, combustible metal powders such as powdered magnesium, and the like, and other such supplementary components conventionally used in the making of solid rocket propellants may be incorporated in the above-described composition in the usual proportions. It is intended, therefore, that all matter contained in the foregoing description shall be interpreted as illustrative only and not as limitative of the invention.

We claim:

1. A solid rocket propellant consisting essentially of 5 to 50% by weight of poly(vinyl lower alkyl ether) and 50 to 95% by weight of a solid inorganic oxidizing salt.

2. A solid rocket propellant as defined in claim 1, wherein said poly(vinyl lower alkyl ether) is poly(vinyl methyl ether).

3. A solid rocket propellant as defined in claim 1, wherein said poly(vinyl lower alkyl ether) is an amorphous poly(vinyl lower alkyl ether).

4. A solid rocket propellant as defined in claim 1, wherein said poly(vinyl lower alkyl ether) is a crystalline poly(vinyl lower alkyl ether).

5. A solid rocket propellant as defined in claim 1, wherein said poly(vinyl lower alkyl ether) is a mixture of an amorphous poly(vinyl lower alkyl ether) and a crystalline poly(vinyl lower alkyl ether).

References Cited in the file of this patent

FOREIGN PATENTS 655,585   Great Britain _____ July 25, 1951

OTHER REFERENCES

Arendale: Industrial and Eng. Chem., vol. 48, No. 4, April 1956, pp. 725–6.

Blatz: Industrial and Eng. Chem., vol. 48, No. 4, April 1956, pp. 727–9.

Zaehringer: Chem. Eng. Progress, vol. 51, No. 7, July 1955, p. 302.

Chilton: Chemical Engineering, Apr. 21, 1958, pp. 126–129.

Chem. and Eng. News, Oct. 7, 1957, pp. 62–3.

Zaehringer: Modern Plastics, vol. 34, October 1956, pp. 148–151.